United States Patent [19]
Brinker

[11] 3,911,611
[45] Oct. 14, 1975

[54] METHOD OF DISPERSING PESTICIDE FLUID

[76] Inventor: Harry Brinker, 6305 McClean Blvd., Baltimore, Md. 21214

[22] Filed: July 8, 1974

[21] Appl. No.: 486,571

[52] U.S. Cl.................................. 43/124; 43/124
[51] Int. Cl.² ....................................... A01M 17/00
[58] Field of Search ..................................... 43/124

[56] References Cited
UNITED STATES PATENTS
2,906,056  9/1959  Youngblood ......................... 43/124
3,151,746  10/1964  Reustle et al. ........................ 43/124

*Primary Examiner*—Louis G. Mancene
*Assistant Examiner*—Daniel J. Leach
*Attorney, Agent, or Firm*—Lawrence E. Laubscher

[57] ABSTRACT

A method for preventing, controlling and exterminating subterranean termites and the like, employing the pre-existing footing drainage conduit system ordinarily provided adjacent the foundation of a building, said system including a first portion arranged at least partially around the foundation, said first portion containing access openings, and a second conduit portion for discharging fluid from the first portion. In operation, the pesticide fluid is introduced into the first conduit portion -- preferably after the second conduit portion has been disabled -- for discharge through the access openings thereof to permeate the fill material in which the first conduit portion is contained. If desired, the system may then be drained and the surplus pesticide recovered for re-use.

8 Claims, 2 Drawing Figures

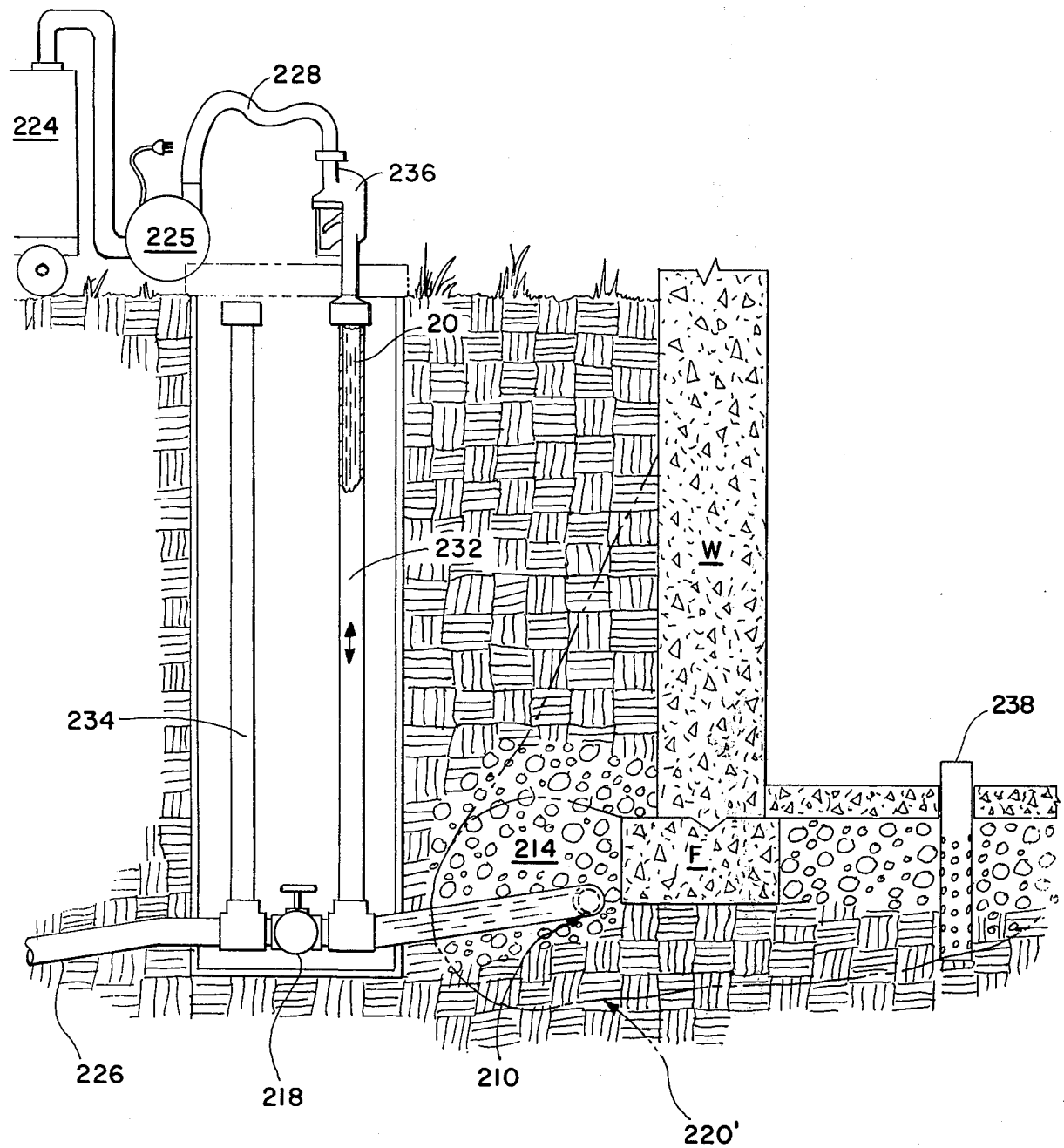

METHOD OF DISPERSING PESTICIDE FLUID

This invention relates generally to pest control and specifically to a post-construction method of diffusing a subterranean termite-barrier around the lower portion of the foundation of an existing dwelling, or other building.

As evidenced by the German Pat. No. 489,679 and the U.S. Pat. Nos. RE. 25,080, 2,842,892, 3,151,746, 3,209,485, 3,513,586 and 3,602,248, various post-construction methods and structures have been disclosed for the purpose. Generally, post-construction methods employ special peripheral installations requiring extensive trenching or multiple perforated-tube driving or the like, some being of general applicability and others of limited applicability, but in all known cases employing little or no pre-existing common building structure for general dissemination of the pesticide.

Various disadvantages of prior art post-construction methods and systems which are avoided by the present invention include structural weakening through hole-drilling in beams, walls, floors and foundations, foundation and sidewalk weakening and shrubbery and tree-root damage through trenching, and undesirable distribution of insecticide around structures at or near ground level. Many of the prior art post-construction methods require expensive apparatus and some employ very high pressures within buildings, possibly resulting in injection of insecticide in unforeseen and undesired locations. Patching, reconstruction and refilling are expensive and often unsightly, particularly in the finished interiors of buildings.

In addition to avoiding the above difficulties, it is believed that the present invention is more efficient than prior art post-construction subterranean termite barrier methods in that it distributes and concentrates greater quantities of insecticide in a given time at appropriate locations around building foundations, and beneath them.

The present invention is of broad but not unlimited applicability in that it largely utilizes for pesticide dissemination pre-existing peripheral structure adjacent most but not all buildings, namely, the footing drainage system which includes a first conduit portion containing access openings and arranged about at least a portion of the outer or inner periphery of the foundation, and a second conduit portion for discharging fluid from the first conduit portion.

Accordingly, a primary object of the present invention is to provide a method for dispersing fluid pesticide around the foundation of a building, including the step of introducing liquid pesticide into the first conduit portion for discharge from the access openings, whereby the pesticide will permeate the porous fill layer and the surrounding soil.

According to a first embodiment of the invention, the second conduit portion is disabled prior to the introduction of pesticide into the first conduit portion. In the situation where the building includes a sump receptacle, a sump pump and a discharge conduit which cooperate to define the second conduit portion, the sump pump is de-activated to disable the second conduit portion, and the fluid pesticide is introduced into the sump receptacle for introduction in the reverse direction into the first conduit portion. In a second embodiment of the gravity drainage type, a shutoff valve is provided for disabling the second conduit section, a standpipe being connected with the first conduit section or with the second conduit section upstream from said valve for introducing the pesticide therein. In a third embodiment wherein the second conduit portion normally affords gravity flow discharge to the first conduit section, the pesticide is introduced into the first section by connecting the pesticide source with the outlet of the second section, whereby the second section is disabled and fluid pesticide is supplied into the first section in the reverse direction through the second section. According to another embodiment, the second conduit portion is not disabled, the fluid pesticide being introduced directly into the first conduit portion under sufficient pressure to cause the fluid pesticide to be discharged from the first conduit portion via the access openings contained therein.

The above and other objects and advantages of the invention will become more readily apparent on examination of the following description, reference being made to the accompanying drawings in which:

FIG. 2 is a side elevation in partial section showing a typical gravity drainage system around a foundation, with provisions for employment of the method of this invention.

FIG. 1 illustrates a typical building foundation wall W supported by a footing F, with a pre-construction footing drainage system 10 around the inner perimeter of the wall having provision for draining to a typical sump 12 at the low point, from which water collected is pumped away by sump pump P.

Figure 1:
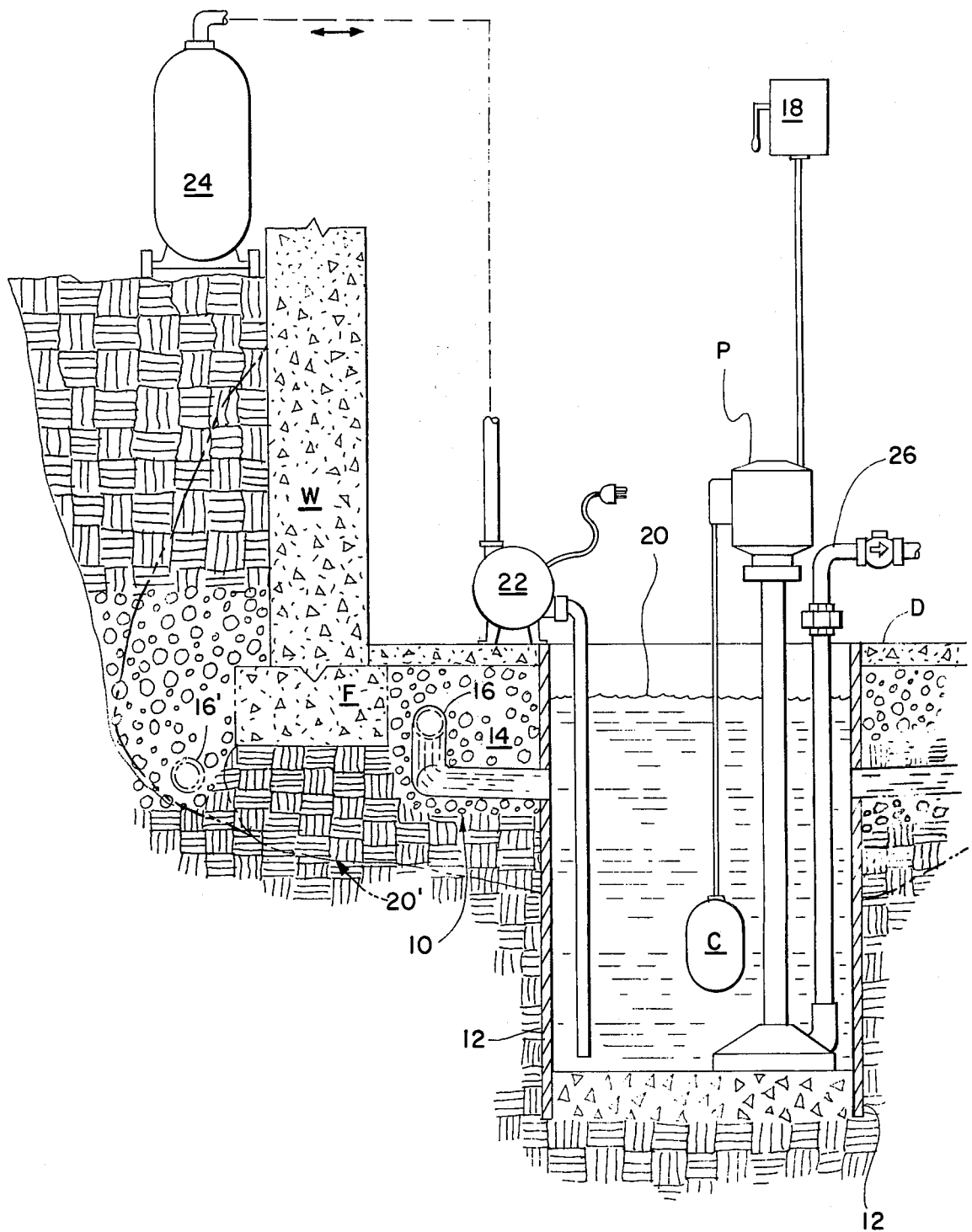
FIG. 1 is a side elevation in partial section showing a typical sump-pumped footing drainage system of the type ordinarily found in dwellings and the like, as employed in the method of this invention.

Typically, a float control C starts and stops the pump and the sump pump exhausts through a line 26 into a dry-well, storm drain or the like.

The drainage system includes a first conduit portion having a drainage bed 14, usually of crushed stone or other fill material, supporting an inclined network of conventional drain tile 16 containing access openings. Usually the conduit system is well below the top of the sump or reservoir tank, which customarily is flush with the concrete deck D. Exterior conduit 16' (phantom lines) may be incorporated in a system according to this invention as well as interior conduit 16.

According to the method of the present invention, the above described system is reverse filled after being well drained of water and preferably during dry weather. The sump pump is first disabled, as by turning off the electric supply at a switch 18, thereby disabling the second conduit section including the sump receptacle and the discharge conduit 26.

Next, the sump is filled to a predetermined level with a fluid pesticide 20. Preferably, one of the low-toxicity pesticides is used, but any of the ordinary preparations such as a 1 percent by volume water emulsion of chlordane, a ½ percent water emulsion of dieldrin, or the like, may be employed. A reversible pump 22 and container 24 or other conventional means may be used for the purpose.

The predetermined level to which the sump is filled is preferably near the top, and the level is preferably maintained by replenishment, as required, until the system has been filled to the greatest extend possible and has had opportunity to saturate soil in the vicinity of the drainage system, forming a barrier 20' by direct flow and by capillary action.

System capacity can be determined for purposes of this invention in the general case by the rate of flow out of the sump or tank reservoir under the head of pesticide provided as measured against time. Successive replenishments will in the normal case require longer times to drain. Normally, the drainage system lies at a fixed distance from the building walls and is, at the highest point, as low as or lower than the footing. The system depth can be verified by probing.

Following saturation of the system it is drained, as by reversing pump 22, and preferably stored for reuse. Any sediment is preferably screened out.

FIG. 2 illustrates the method of this invention in use at a building having no sump. As indicated, in such circumstances the first conduit portion 210 communicates with the second conduit portion 226 which drains downhill into a dry well, storm drain, or the like.

According to the present invention all or a portion of the pipe is blocked as by a valve installation at 218, and a simple standpipe 232, communicating with the blocked portion, is installed adjacent the valve and in communication with the first conduit portion.

Pesticide fluid 20 is then introduced via pump 225 and pumping line 228 into the blocked portion through the standpipe to a level sufficient to fill the drainage system 210. Preferably, pesticide fluid is added to maintain the level in the standpipe during the filling to assure expression of the fluid from the system when the system is filled.

When the filling is complete and a barrier 220' is formed, the pesticide is drained or pumped out of the system for re-use after removal of foreign material such as sediment, preferably.

As an additional feature, a second standpipe 234 may be disposed downstream of valve 218 to provide means of cleanout of the downhill drain portion by power-flushing with water.

In either of the embodiments described the system may be sealed at the pesticide fluid introduction point and may be filled under pump pressure. In FIG. 2 this arrangement is illustrated, fluid being pumped from container 224 by pump 225 through sealing nozzle 236 and standpipe 232 into the system.

Level of saturation may be determined by observing the fluid level in a perforate pipe 238 vertically inserted at a suitable location adjacent the system being backflushed.

Obviously other modifications and variations of the present invention are possible in light of the above teachings. For example, in a third embodiment (not shown) where the second conduit section merely constitutes a gravity discharge conduit leading from the porous first conduit section that at least partially surrounds the foundation, the second conduit section is disabled by connecting a source of liquid pesticide to the outlet thereof, whereupon the pesticide is introduced into the first conduit section by reverse flow through the second conduit section. According to another embodiment (not shown), the second conduit portion is not disabled, the pesticide fluid being supplied directly into the first conduit portion (for example, via a pipe driven through the fill material and through an opening formed thereby in the first conduit portion) under sufficient pressure to force the pesticide fluid outwardly from the first conduit portion via the access openings thereof into the fill material.

What is claimed is:

1. The method of dispersing fluid pesticide to form a pesticide barrier adjacent the foundation of a building having a preexisting footing drainage system, said drainage system including a first conduit portion containing access openings and arranged in fill material adjacent the building foundation, and a second conduit portion for normally discharging fluid from said first conduit portion, which comprises the step of introducing into the first conduit portion a quantity of fluid pesticide at sufficient pressure to force said fluid pesticide outwardly from said first conduit portion via said access openings into said fill material.

2. The method as defined in claim 1, and further including the step of disabling the second conduit portion.

3. The method as defined in claim 2, wherein the pesticide introducing step includes introducing the pesticide under pressure into said first conduit portion at a location adjacent the second conduit portion.

4. The method as recited in claim 2, wherein the footing drainage system includes a normally open valve connected between the first and second conduit sections; and further wherein the step of disabling the second conduit section comprises closing said valve.

5. The method as recited in claim 4, wherein said second conduit portion includes a gravity drain pipe, and further wherein said drainage system includes a vertical standpipe connected at its lower end with said first conduit portion adjacent said valve; and further wherein the step of introducing said pesticide into said first conduit means comprises supplying the liquid pesticide to the upper end of said standpipe.

6. The method as recited in claim 2, wherein said second conduit portion has an outlet;

and further wherein the steps of disabling said second conduit portion and supplying fluid pesticide to said first conduit portion comprises connecting a source of the fluid pesticide to the outlet of said second conduit portion, whereby the pesticide is supplied to the first conduit portion via said second conduit portion.

7. The method of dispersing fluid pesticide to form a pesticide barrier adjacent the foundation of a building having a preexisting footing drainage system, said drainage system including first conduit means containing access openings and arranged in fill material adjacent the building foundation, a sump receptacle connected with said first conduit means for alternately receiving fluid from and for supplying fluid to said first conduit means, second conduit means for discharging fluid, and normally activated sump pump means for normally pumping fluid from said sump receptacle into said second conduit means, which includes the steps of a. disabling said second conduit means by deactivating said sump pump means; and b. introducing into said first conduit means a quantity of fluid pesticide at sufficient pressure to force said fluid pesticide outwardly from said first conduit means via said access openings into said fill material, said fluid pesticide being introduced into said first conduit means by supplying to said sump receptacle a sufficient quantity of pesticide fluid at sufficient pressure to cause said pesticide to enter said first conduit portion and to be discharged from the access openings thereof.

8. The method as recited in claim 7, and further including the step of replenishing the quantity of fluid pesticide in the sump receptacle to maintain the level thereof sufficient to produce a pressure head which causes the pesticide to enter said first conduit means and to be discharged from the access openings thereof.

* * * * *